(12) United States Patent
Lutz et al.

(10) Patent No.: US 7,131,931 B2
(45) Date of Patent: Nov. 7, 2006

(54) GEARBOX CONTROL SYSTEM

(75) Inventors: Otto Lutz, Meersburg (DE); Franz Sorg, Langenargen (DE); Peter Muschel, Friedrichshafen (DE); Roland Leibinger, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/473,423

(22) PCT Filed: Apr. 8, 2002

(86) PCT No.: PCT/NL02/00226

§ 371 (c)(1),
(2), (4) Date: Nov. 18, 2003

(87) PCT Pub. No.: WO02/084152

PCT Pub. Date: Oct. 24, 2002

(65) Prior Publication Data

US 2004/0106501 A1 Jun. 3, 2004

(30) Foreign Application Priority Data

Apr. 18, 2001 (DE) .................... 101 18 855

(51) Int. Cl.
*F16H 61/26* (2006.01)
*F16H 61/00* (2006.01)
*G06F 7/00* (2006.01)

(52) U.S. Cl. .................. 477/159; 477/117; 477/906; 701/60

(58) Field of Classification Search ............. 477/156, 477/158, 159, 906, 127, 143, 117; 701/57–61
See application file for complete search history.

(56) References Cited

U.S. PATENT DOCUMENTS

| 4,562,729 | A | * | 1/1986 | Maloney ................. 73/118.1 |
| 4,742,461 | A | * | 5/1988 | Eschrich et al. ............ 701/58 |
| 4,855,914 | A | | 8/1989 | Davis et al. ............ 364/424.1 |
| 4,986,145 | A | | 1/1991 | Mehta ..................... 74/843 |
| 5,157,609 | A | | 10/1992 | Stehle et al. |
| 5,492,508 | A | * | 2/1996 | Tsukamoto et al. ......... 475/125 |
| 5,719,768 | A | | 2/1998 | Tashiro et al. ....... 364/424.096 |
| 5,737,712 | A | * | 4/1998 | Han et al. ................. 477/158 |
| 5,951,615 | A | * | 9/1999 | Malson ..................... 701/57 |
| 6,022,293 | A | * | 2/2000 | Dourra et al. ............. 477/158 |
| 6,155,948 | A | * | 12/2000 | Gierer ..................... 475/123 |
| 6,332,860 | B1 | * | 12/2001 | Hubbard et al. ........... 477/143 |
| 6,334,833 | B1 | * | 1/2002 | Ochi et al. ............... 477/906 |
| 6,393,943 | B1 | * | 5/2002 | Sommer et al. .......... 74/606 R |
| 6,931,924 | B1 | * | 8/2005 | Henneken ................... 73/168 |

FOREIGN PATENT DOCUMENTS

| DE | 195 11 996 C1 | 8/1996 |
| DE | 198 02 216 A1 | 4/1999 |
| DE | 199 43 335 A1 | 4/2001 |
| EP | 0 493 699 A1 | 7/1992 |

(Continued)

OTHER PUBLICATIONS

*ATZ Automobiltechnische Zeitschrift 93 (1991).*

(Continued)

*Primary Examiner*—Roger Pang
(74) *Attorney, Agent, or Firm*—Davis & Bujold, P.L.L.C.

(57) ABSTRACT

In a gearbox control system (8) for detecting systematic errors and long-term changes, the behavior of a real gearbox (1) is compared to the behavior of an ideal gearbox (7), which is implemented in the form of a gearbox model in the gearbox control system (8).

7 Claims, 1 Drawing Sheet

FOREIGN PATENT DOCUMENTS

| | | |
|---|---|---|
| EP | 0 531 567 A1 | 3/1993 |
| EP | 0 635 659 B1 | 9/1999 |

OTHER PUBLICATIONS

Welter, Andreas, Friedrich Renoth and Emanuel Fuchs, Die Adaptive Getriebesteuerung für BMW-Automobile, *ATZ Automobiltechnische Zeitschrift* 95 (*1993*) 9, including English translation of Section 2.

Kücükay, Ferit and Friedrich Renoth, "Intelligente Steuerung von Automatikgetrieben durch den Einsatz der Elektronik", *ATZ Automobiltechnische Zeitschrift* 96 (*1994*) 4, including English translation of Section 2.

\* cited by examiner

US 7,131,931 B2

GEARBOX CONTROL SYSTEM

This application is a national stage completion of PCT/EP02/04088 filed Apr. 12, 2002 which claims priority from German Application Serial No. 101 18 885.2 filed Apr. 18, 2001.

FIELD OF THE INVENTION

The invention concerns a gearbox control system.

BACKGROUND OF THE INVENTION

Gearboxes can be individually adapted to different types of vehicles with the aid of gearbox control systems. In doing so, the gearbox control system makes possible the integration of functions that are relevant to comfort, safety, and service. The shifting comfort is generally in the foreground, even though it is directly felt by the driver. Other important functions concern the shift point control, safety, and diagnosis. Shifting comfort is still quite important. An excellent shifting comfort, which remains constant during the entire service life of the gearbox, is the main duty of the gearbox control system.

The shifting comfort is influenced by a variety of parameters which are described in the *ATZ Automobiltechnische Zeitschrift* 93 (1991). By means of an optimal combination of friction elements, such as multi-plate clutches and brake band and the corresponding gearbox oil, a constant friction value level can be achieved. The shifting pressure of the multi-plate clutches or of the brake band is controlled in dependence upon parameters such as gear stage, engine speed, throttle flap angle for thrust-traction recognition, gearbox output speed, engine speed, gearbox temperature, and engine temperature in such a way that a uniform shifting operation always takes place. Furthermore, an adaptive pressure control takes place; that is, the deviations from specific parameters are automatically corrected during the operation time of the gearbox.

For this reason, the response times or gliding times are permanently measured and average response times are determined from several shifting operations. If there is a deviation of the average response time from desired response times dependent from the load and engine speed, the clutch pressure is changed until the desired response time is reached.

In this solution, which is known from the state of the art, it is not possible to detect, however, and correct systematic errors and long-term changes, since gearbox transmission errors cannot be detected.

In EP 0 531 567 A1 a gearbox control system for a motor vehicle drive with an automatic gearbox is described, which makes it possible to adapt shifting characteristic lines. The control system has a characteristic line storage in which the shifting points of the gearbox are stored, and additional devices can be modified by means of which the shifting points in dependence upon the driving parameters. Based on an evaluation of the output speed of the gearbox, carried out at successive time in intervals, the shifting arrangement generates an output signal by means of which the shifting characteristic lines can be adapted to the load condition of the motor vehicle. This control system does not make possible, however, a shifting pressure change and thus also the gearbox torque transmission behavior cannot be adapted to the long-term changes.

It is an object of the invention to present a gearbox control system which can detect gearbox transmission errors and thus can compensate for systematic errors and long-term changes.

The basic object of the invention is attained by means of a gearbox control system of the type described above.

SUMMARY OF THE INVENTION

Comparisons between the real behavior of a gearbox and the behavior of an ideal reference gearbox take place to attain the objective. This reference gearbox is implemented in the gearbox control system in the form of a gearbox model. For this purpose, the calculated shifting pressure is sent by means of a pressure control valve to the gearbox and, at the same time, fed to the reference gearbox in the gearbox control system. During the shifting operation, the gearbox control system continuously measures the previously defined parameters of the gearbox and compares them to the corresponding parameters of the reference gearbox. The gearbox control system determines the deviations between the parameters of the real gearbox and the reference gearbox and calculates a pressure correction value therefrom which is taken into consideration during the next shifting operation, and is superimposed on the real gearbox in such a way the behavior of the real gearbox and the reference gearbox converge. This operation is repeated for each further shifting operation until the deviations between the real gearbox and the reference gearbox have been reduced to a minimum. In an ideal case, a correspondence between the real gearbox and the reference gearbox results. The adaptation of the real gearbox and the reference gearbox can take place, to a great extent, independently from the operating condition. All the occurring known systematic influencing variables can be integrated in the reference gearbox and can thus be taken into account during operation. For example, load conditions, shift points, accelerations, and temperatures can be incorporated in the reference gearbox. The adaptation of the real gearbox and reference gearbox can also take place independently of the gradient of the shifting pressure. The shifting pressure can, therefore, also include any desired components of a pressure control or a superimposed pressure control, without this having an effect on the adaptation of the real gearbox to the reference gearbox.

BRIEF DESCRIPTION OF THE DRAWING

The invention will now be described, by way of example, with reference to the accompanying drawing in which:

The single FIGURE (FIG. 1) shows a schematic of a gearbox control system of the invention.

DETAILED DESCRIPTION OF THE INVENTION

Figure 1:
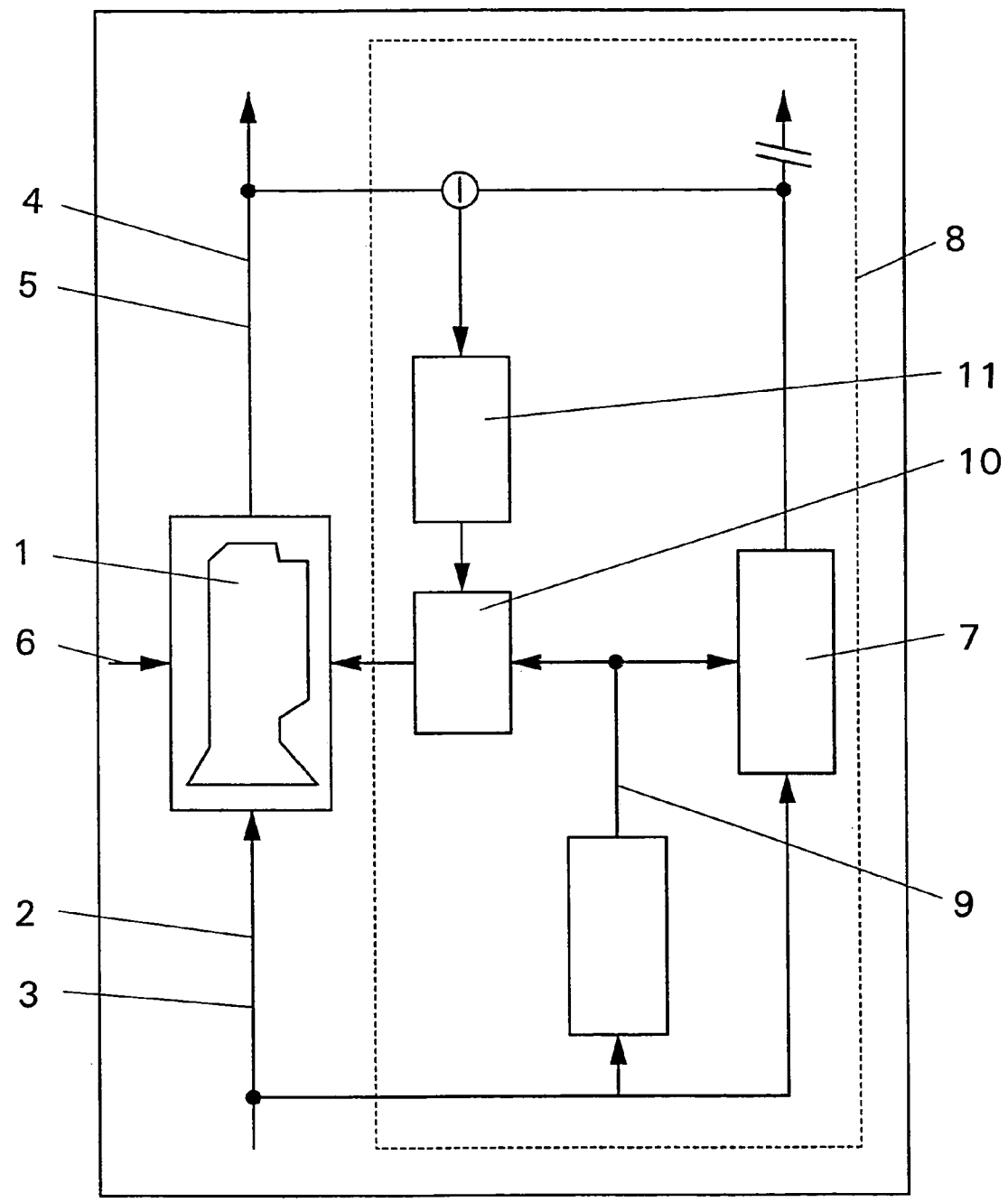

A real gearbox 1 is characterized by the actual condition which is defined by parameters, such as, the input speed 2 and the input torque 3 as well as the output speed 4 and the output torque 5. Disturbance variables 6 are added to them, which influence the real gearbox. Illustrative examples of the parameters and of disturbance variables 6 are presented in *ATZ Automobiltechnische Zeiftschrift* 95 (1993), "Die Adaptive Getriebesteuerung fur BMW-Automobile", pgs. 420–434, *ATZ Automobiltechnische Zeitschrift* 96 (1994), "Intelligente Steuerung von Automatikgetrieben durch den Einsatz der Elektronik", pgs 228–235 and in U.S. Pat. No. 5,157,609 issued Oct. 20, 1992 to Stehle et al. for a METHOD AND APPARATUS FOR CONTROLLING AN AUTOMATICALLY SHIFTING TRANSMISSION, for example. A desired condition is determined from the input speed 2 and the input torque 3 in an ideal reference gearbox 7 which is integrated, as a gearbox model, in the gearbox control system 8. From the input speed 2 and input torque 3 parameters, a shifting pressure 9 is calculated, which is further processed with the deviation from the actual condition and desired condition in the gearbox control system 8 to a pressure correction value 10. In addition, with the aid of an adaptation logarithm 11 error functions can be integrated in the calculation of the pressure correction value 10.

The invention claimed is:

1. A gearbox control system (8) for detecting one of a systematic error and a long-term change;
   wherein during each gearshift operation, under actual driving conditions, at least one of an input torque behavior and an input speed behavior and at least one of an output speed behavior and an output torque behavior of an actual gearbox (1) is compared to at least one of a predetermined fixed input torque behavior and a predetermined fixed input speed behavior and at least one of a predetermined fixed output speed behavior and a predetermined fixed output torque behavior of a predetermined fixed ideal reference gearbox model (7) analytically determined from an original design of the gearbox and stored in the gearbox control system (8) and control inputs to the actual gearbox are modified for a subsequent gearshift operation to drive the actual gearbox to have a shifting behavior of the predetermined fixed ideal reference gearbox model (7).

2. The gearbox control system (8) according to claim 1, wherein a calculated shifting pressure (9) is sent to the actual gearbox (1) and, at the same time, fed to the predetermined fixed ideal reference gearbox model (7) of the gearbox control system (8).

3. The gearbox control system (8) according to claim 1, wherein the gearbox control system (8), during a shifting operation, continuously measures previously defined parameters of the gearbox and compares the previously defined parameters to corresponding predetermined fixed parameters of the predetermined fixed ideal reference gearbox model (7).

4. The gearbox control system (8) according to claim 1, wherein deviations between parameters of the actual gearbox and predetermined fixed parameters of the predetermined fixed ideal reference gearbox model (7) are determined and a pressure correction value (10) is calculated therefrom, which is taken into account during a next shifting operation, and which is superimposed on the shifting pressure of the actual gearbox in such a way that properties of the actual gearbox (1) converge on the properties of the predetermined fixed ideal reference gearbox model (7).

5. The gearbox control system (8) according to claim 1, wherein adaptation of the actual gearbox (1) and the predetermined fixed ideal reference gearbox model (7) takes place, to a great extent, independently of an operating condition and of a gradient of the shifting pressure.

6. A gearbox control system (8) for correcting shifting pressure of a gearbox, the gearbox control system comprising the steps of:
   providing a predetermined fixed ideal reference gearbox model (7) in the gearbox control system (8) and defining a plurality of predetermined fixed gearbox parameters for the predetermined fixed ideal reference gearbox model (7) wherein the predetermined fixed ideal reference gearbox model (7) is analytically determined from an original design of the gearbox;
   installing the gearbox control system (8) in an actual gearbox (1);
   for each gearshift operation, under actual driving conditions and over a useful life of the actual gearbox (1), determining a plurality of actual gearbox parameters of the actual gearbox (7) by measuring at least one of an input torque behavior and an input speed behavior and at least one of an output speed behavior and an output torque behavior four the actual gearbox (7) corresponding to at least one of a predetermined input torque behavior and a predetermined input speed behavior and at least one of a predetermined output speed behavior and a predetermined output torque behavior;
   for each gearshift operation, comparing the plurality of actual gearbox parameters with the corresponding plurality of predetermined fixed ideal reference gearbox model parameters; and
   for each gearshift operation, determining a deviation between the plurality of actual gearbox parameters with the corresponding plurality of predetermined fixed ideal reference gearbox model parameters; and
   for each subsequent gearshift operation, calculating a pressure correction value from the deviation and applying the pressure correction value to the actual gearbox (1) to correct the shifting pressure for the actual gearbox (1) so that the actual gearbox (1) has a shifting behavior which converges with the shift behavior of the predetermined fixed ideal reference gearbox model (7).

7. The gearbox control system (8) according to claim 6, wherein the comparison of the actual gearbox (1) and the predetermined fixed ideal reference gearbox model (7) takes place substantially independently of an operating condition and of a gradient of the shifting pressure.

* * * * *